United States Patent
Bosma (10) Patent No.: US 10,258,016 B2
(45) Date of Patent: Apr. 16, 2019

(54) CLEANING SYSTEM AND METHOD FOR AN AUTOMATIC MILKING SYSTEM

(71) Applicant: DELAVAL HOLDING AB, Tumba (SE)

(72) Inventor: Epke Bosma, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 171 days.

(21) Appl. No.: 15/307,019

(22) PCT Filed: May 8, 2015

(86) PCT No.: PCT/SE2015/050515
§ 371 (c)(1),
(2) Date: Oct. 27, 2016

(87) PCT Pub. No.: WO2015/171067
PCT Pub. Date: Nov. 12, 2015

(65) Prior Publication Data
US 2017/0042112 A1 Feb. 16, 2017

(30) Foreign Application Priority Data
May 9, 2014 (SE) ...................................... 1450549

(51) Int. Cl.
*A01J 7/02* (2006.01)
*A01J 5/007* (2006.01)
*A01J 7/04* (2006.01)

(52) U.S. Cl.
CPC ............... *A01J 7/022* (2013.01); *A01J 5/007* (2013.01); *A01J 7/025* (2013.01); *A01J 7/04* (2013.01)

(58) Field of Classification Search
CPC .... A01J 7/022; A01J 7/025; A01J 7/04; A01J 5/007

(Continued)

(56) References Cited

U.S. PATENT DOCUMENTS 2,956,571 A  10/1960  Heisler
3,119,400 A   1/1964  Bihler
(Continued)

FOREIGN PATENT DOCUMENTS

DE   20 2009 004670 U1   9/2009
EP       0 535 755 A2    4/1993
(Continued)

OTHER PUBLICATIONS

International-Type Search Report, dated Dec. 15, 2014, from corresponding PCT application.

(Continued)

*Primary Examiner* — Joshua D Huson
(74) *Attorney, Agent, or Firm* — Young & Thompson (57) ABSTRACT

A cleaning system for an automatic milking system includes a water supply arrangement alternatively serving first and second cleaning arrangements. The first cleaning arrangement is configured, in milking mode, to clean the teat cups of the automatic milking system and/or the teats of milking animals prior to being milked. The first cleaning arrangement includes at least one cleaning module, at least one feed line interconnecting the cleaning module with a tank, and a feed pump for feeding water from the tank to the cleaning module. The second cleaning arrangement is configured, in system cleaning mode, to clean the automatic milking system and includes a detergent supply system connected to the tank for supplying detergent to the tank, and a supply line interconnecting the tank with the automatic milking system allowing the cleaning liquid to be supplied to the automatic milking system.

19 Claims, 2 Drawing Sheets (58) Field of Classification Search
USPC ...................................................... 119/14.02
See application file for complete search history.

(56) References Cited

U.S. PATENT DOCUMENTS

| | | | | |
|---|---|---|---|---|
| 4,015,618 A * | 4/1977 | Schmid | ................... | A01J 7/022 |
| | | | | 134/58 R |
| 4,222,346 A * | 9/1980 | Reisgies | ................. | A01J 7/025 |
| | | | | 119/14.08 |
| 4,366,943 A * | 1/1983 | Licary | ....................... | A01J 7/02 |
| | | | | 119/14.18 |
| 4,572,105 A * | 2/1986 | Chowdhury | ............ | A01J 7/022 |
| | | | | 119/14.18 |
| 5,383,423 A | 1/1995 | Van Der Lely | | |
| 5,390,627 A | 2/1995 | Van Der Berg et al. | | |
| 5,405,452 A | 4/1995 | Anderson et al. | | |
| 5,678,506 A | 10/1997 | Van Der Berg et al. | | |
| 5,762,020 A | 6/1998 | Van Der Lely | | |
| 5,881,669 A * | 3/1999 | van den Berg | ......... | A01J 5/007 |
| | | | | 119/14.03 |
| 5,896,828 A * | 4/1999 | Kronschnabel | ......... | A01J 7/022 |
| | | | | 119/14.02 |
| 6,089,242 A * | 7/2000 | Buck | ....................... | A01J 7/022 |
| | | | | 119/14.18 |
| 6,199,507 B1 * | 3/2001 | Cassells | ................... | A01J 7/022 |
| | | | | 119/14.02 |
| 8,025,029 B2 * | 9/2011 | Torgerson | ............... | A01J 7/025 |
| | | | | 119/14.18 |
| 8,033,247 B2 * | 10/2011 | Torgerson | ................. | A01J 7/04 |
| | | | | 119/14.47 |
| 8,336,502 B2 * | 12/2012 | Wilmert | ................... | A01J 7/04 |
| | | | | 119/14.18 |
| 8,443,757 B2 * | 5/2013 | Westman | ................ | A01J 7/022 |
| | | | | 119/14.15 |
| 8,540,821 B2 * | 9/2013 | Van Den Berg | ........ | A01J 7/025 |
| | | | | 134/166 R |
| 9,686,958 B2 * | 6/2017 | Sellner | .................... | A01J 5/007 |
| 2009/0194029 A1 * | 8/2009 | Persson | ................... | A01J 7/022 |
| | | | | 119/14.02 |
| 2011/0120378 A1 * | 5/2011 | Johannesson | .......... | A01J 5/045 |
| | | | | 119/14.18 |
| 2011/0220160 A1 | 9/2011 | Bosma | | |

FOREIGN PATENT DOCUMENTS

| | | |
|---|---|---|
| EP | 1 046 336 A2 | 10/2000 |
| WO | 01/19173 A1 | 3/2001 |

OTHER PUBLICATIONS

International Search Report, dated Sep. 2, 2015, from corresponding PCT application.

* cited by examiner

CLEANING SYSTEM AND METHOD FOR AN AUTOMATIC MILKING SYSTEM

TECHNICAL FIELD

The technical field is generally devoted to cleaning systems and methods for automatic milking systems.

RELATED ART

Automatic milking systems, also referred to as voluntary milking systems, have been commercially available since the early 1990's. The core of such systems that allow complete automation of the milking process is a type of agricultural robot. Automated milking is therefore also called robotic milking. Common systems rely on the use of computers and special herd management software.

Advantages include the elimination of substantial labor, increased milking frequency, perceived lower stress environment, and herd management capabilities.

In such automatic milking systems, cleaning of the teats of the milking animals is performed automatically prior to the milking thereof. Typically, the interior and/or exterior of the teat cups of the automatic milking systems is/are cleaned automatically such as e.g. between each of the milkings. Further, the automatic milking system itself has to be cleaned regularly. Many patent documents are related to different kind of cleaning systems for automated milking systems.

EP 0 535 755 discloses an implement for cleaning teats of milk-producing animals, such as cows, with a computer having means for process control. With the aid of this computer, cleaning means are supplied to an animal's udder. During cleaning, with the aid of monitoring means the contamination of the used cleaning means is determined. When it has been established that the contamination of the cleaning means has come below a predetermined standard, the cleaning process is terminated and the milking process subsequently started.

U.S. Pat. No. 5,390,627 discloses an apparatus and method for automatically cleaning the teat cups of a milking apparatus. The teat cups are automatically removed by a robot arm from the animal's teats. Nozzles are provided which are automatically inserted into the openings for the teats located on top of the teat cups. In the cleaning operation, the nozzles are, in effect, connected to the teat cups and spray a cleansing and/or rinsing liquid through an upper set of outlets from the nozzle to clean the upper surfaces of the teat cups and through a lower set of nozzle outlets to clean and rinse the interior of the teat cups as well as the lines connected therewith. Associated with the nozzles are rotatable cleaning members for cleaning the animals' teats and udders in the vicinity thereof. Brushes and spray nozzles are provided for automatically cleaning these cleaning members after use. All operations are programmed to occur automatically without human assistance or intervention.

EP 1 046 336 B1 discloses an implement for milking animals, such as cows, comprising at least one milking robot for automatically connecting teat cups to the teats of an animal, and at least one milking machine for automatically milking the animals. The cleaning of the milking system is effected when, after an animal has been milked, a fixed period of time has elapsed without a next animal having presented itself to be milked, unless the degree of contamination is such that the milking system has to be cleaned.

US 2011/220160 discloses an arrangement for controlling the supply of cleaning liquid into a milking system and includes a pressurizing arrangement adapted to pressurize the cleaning liquid, a supply arrangement for selectively supplying cleaning liquid and a pressure sensing arrangement for sensing the pressure in the milking system. The pressure sensing device is operatively connected to the supply arrangement, and the supply arrangement is adapted to supply cleaning liquid into the milking system depending on the sensed pressure in the milking system. The arrangement can be adapted to supply cleaning liquid when the sensed pressure in the milking system is below the atmospheric pressure.

SUMMARY

However, the prior art cleaning systems for automated milking systems are typically each only concerned with one of the various cleaning tasks: teat cleaning, teat cup cleaning, and milking system cleaning.

Further, the prior art cleaning systems are not provided with safe and easily installable cleaning water supply arrangements.

It is an aim of this document to reveal novel cleaning systems and methods for automatic milking systems, which alleviate or at least mitigate problems of the prior art.

It is a particular aim to disclose such cleaning systems and methods, which are easily and efficiently set up at a dairy farm, which fulfill requirements to prevent pollution backflow, and which support efficient and precise cleaning of the teat cups of the automatic milking system and/or the teats of milking animals prior to being milked by the automatic milking system as well as of the automatic milking system itself. A first aspect refers to a cleaning system adapted to an automatic milking system including teat cups, a milk collecting vessel, and a milk tube arrangement interconnecting the teat cups with the milk collecting vessel. The cleaning system comprises a water supply arrangement, first and second cleaning arrangements, and a control arrangement.

The water supply arrangement comprises a supply system connectable to cold and hot tap water e.g. originating from a city water supply, and a tank provided with an overflow, wherein the supply system has an outlet orifice for supplying water to the tank, wherein the orifice opens into the tank with a vertical air gap between the outlet orifice and the highest obtainable water level in the tank.

The first cleaning arrangement is arranged for cleaning the teat cups of the automatic milking system and/or the teats of milking animals prior to being milked by the automatic milking system and comprises at least one cleaning module, at least one feed line interconnecting the at least one cleaning module with the tank, and a feed pump for feeding water from the tank to the at least one cleaning module. The interior and/or the exterior of the teat cups may be cleaned before being used for milking of a milking animal in the cleaning of the teat cups. The interior of the teat cups may be cleaned in a back flush procedure.

The second cleaning arrangement is arranged for cleaning the automatic milking system and comprises a detergent supply system connected to the tank for supplying detergent to the tank, thus forming a cleaning liquid; and a supply line interconnecting the tank with the automatic milking system allowing the cleaning liquid to be supplied to the automatic milking system. The interior surfaces of the teat cups, the milk tube arrangement, and the milk collecting vessel, which come into contact with milk, may be cleaned during the cleaning of the automatic milking system.

The second cleaning arrangement may comprise a return line interconnecting the automatic milking system with the tank allowing the cleaning liquid to be returned to the tank or a waste line connected to the automatic milking system allowing the cleaning liquid to be removed from the automatic milking system without being circulated.

The control arrangement is configured to automatically control the operation of the water supply arrangement and the first and second cleaning arrangements.

Advantageously, the cleaning system may be alternately operable in a milking mode and in a system cleaning mode, wherein the control arrangement is configured, in the milking mode, to control the first cleaning arrangement to clean the teat cups of the automatic milking system and/or the teats of the milking animals prior to being milked by the automatic milking system in a process comprising repetitively feeding water from the tank to the at least one cleaning module. The control arrangement is configured, in the system cleaning mode, to control the second cleaning arrangement to clean the automatic milking system in a process comprising feeding water from the tank to the automatic milking system via the supply line of the second cleaning arrangement.

Hereby, a single cleaning system with a single water supply arrangement for supplying water to various cleaning arrangements for the cleaning of both the automatic milking system and the teats of the milking animals is obtained.

The claimed water supply arrangement provides for a solution, which fulfills national and international requirements and regulations of devices to prevent pollution by backflow into potable water and provides thereby protection against such kind of water pollution.

The cleaning system is an easily installable plug-in system for any existing automatic milking system. The cleaning system requires typically only one water supply connection for cold water one water supply connection for hot water, and one power supply connection.

In one embodiment, the control arrangement is configured, in the milking mode, to keep the detergent supply system switched off from the tank, and the control arrangement is configured, in the system cleaning mode, to keep the at least one cleaning module switched off from the tank.

Hereby, it is safeguarded that no detergent from the detergent supply system can leak into the at least one cleaning module, in the milking mode, thereby entirely avoiding the risk that the detergent can be introduced into the milking system and/or come into contact with the teats of the milking animals. Similarly, in the system cleaning mode, it is assured that cleaning liquid from the tank cannot contaminate the at least one cleaning module, which then would have to be cleaned before being used for cleaning the teat cups of the automatic milking system and/or the teats of milking animals, or otherwise, such cleaning liquid may come into contact with the teats of the milking animals and potentially cause harm.

In one embodiment, the supply system comprises a cold water line connectable to cold tap water and provided with a controllable valve and a hot water line connectable to hot tap water and provided with a controllable valve, wherein the cold and hot water lines are connected to an outlet line in an upstream end thereof, wherein a downstream end of the outlet line is comprised of the outlet orifice. The control arrangement is configured to control the controllable valves, thereby controlling the flow rate and temperature of the mixed tap water in the outlet line.

Further, the supply system may comprise a flow meter for repeatedly measuring the flow rate of mixed tap water in the outlet line and a temperature sensor for repeatedly measuring the temperature of mixed tap water in the outlet line, wherein the flow meter and the temperature sensor may be operatively connectable to the control arrangement to repeatedly transmit their measured values to the control arrangement. The control arrangement may be capable of regulating the flow rate and temperature of the mixed tap water in the outlet line by means of controlling the controllable valves based on the repeatedly transmit measured values of the flow rate and temperature of the mixed tap water in the outlet line.

By such provisions, the supply system only requires one cold water line and one hot water line to be connected when the cleaning system is set up. The control arrangement can regulate the flow rate and temperature of the water supplied to the tank by means of the controllable valves. The flow meter and temperature sensor provide feedback control possibilities such that the control arrangement at each instant is capable of regulating the flow rate and temperature of the water supplied to the tank based on the measured flow rate and temperature thereof.

In one embodiment, the control arrangement is configured, in the milking mode, to supply water to the tank by means of controlling the controllable valve of the cold water line to open first and controlling the controllable valve of the hot water line to open thereafter, to avoid the risk of allowing water of higher temperatures than desired to enter the outlet line and the tank. Such high temperature could be harmful for the milking animals if being used for teat cleaning. A suitable temperature of water supplied to the tank may be between 20 and 40° C., preferably between 25 and 35° C.

In one embodiment, the tank is provided with a level sensor for repeatedly sensing the level of water in the tank, wherein the level sensor is operatively connectable to the control arrangement to repeatedly transmit its measured value to the control arrangement, and the control arrangement may be capable of regulating the flow rate of the mixed tap water in the outlet line by means of controlling the controllable valves based on the repeatedly transmit measured value of the level of water in the tank. In particular, the control arrangement may be arranged to supply water to the tank either of a given amount or to a given level, when the level sensor indicates a level falling below a threshold level, by controlling the controllable valves to open, after which the controllable valves are controlled to close. Such supply of water is preferably arranged to occur in the milking mode.

The threshold level and/or the given amount or given level may be set depending on the amount of water from the tank which is fed to the at least one cleaning module, which is responsible for the teat cleaning, for cleaning the teat cups of the automatic milking system and/or the teats of a milking animal prior to being milked by the automatic milking system.

The threshold level and/or the given amount or given level may advantageously be set such that the tank will not run out of water in the milking mode, while a plurality of milking animals are milked. Preferably, the supply of water should be performed such that there is water left in the tank when switching from milking mode to system cleaning mode to be used directly in a first rinsing phase of the cleaning of the automatic milking system, simultaneously as more water is supplied to the tank.

Further, the automatic milking system may comprise a milk sampling device, and the first cleaning arrangement may comprise a cleaning module for this purpose. The control arrangement may be configured, e.g. in the system cleaning mode, to control the first cleaning arrangement to clean the milk sampling device, which comprises to feed water from the tank to the cleaning module, which is responsible for cleaning the milk sampling device.

In one embodiment, wherein the second cleaning arrangement comprises a return line interconnecting the automatic milking system with the tank, the control arrangement may be configured, in the system cleaning mode, to control means comprised in, and/or connected to, the second cleaning arrangement to circulate the cleaning liquid in a closed loop as formed by the tank, the supply line of the second cleaning arrangement, the automatic milking system, and the return line of the second cleaning arrangement. The means may comprise a vacuum source of the automatic milking system for drawing cleaning liquid from the tank and through the supply line of the second cleaning arrangement, the teat cups, and the milk tube arrangement to the milk collecting vessel, and a pump arranged in the return line of the second cleaning arrangement for pumping the cleaning liquid in the milk collecting vessel back to the tank via the return line of the second cleaning arrangement.

Further, the control arrangement may be configured, in the system cleaning mode, to control the means comprised in, and/or connected to, the second cleaning arrangement to flow water from the tank, through the milking system via the supply line of the second cleaning arrangement, and into a drain via the return line of the second cleaning arrangement prior to, and subsequent to, the circulation of the cleaning liquid in the closed loop formed by the tank, the supply line of the second cleaning arrangement, the automatic milking system, and the return line of the second cleaning arrangement.

The flowing of water through the automatic milking system before the circulation of the cleaning liquid may be referred to as a pre-cleaning or first rinsing phase, in which easily removable milk residues in the interior of the automatic milking system are removed by the water flow. The circulation of the cleaning liquid may be referred to as a main cleaning phase and the flowing of water through the automatic milking system after the circulation of the cleaning liquid may be referred to as a post-cleaning or second rinsing phase, in which the cleaning liquid, which may be harmful to milking animals and humans, is removed from the automatic milking system.

More in detail, the control arrangement may be configured, in the system cleaning mode, to switch on the means comprised in, and/or connected to, the second cleaning arrangement to start flow water from the tank, through the milking system via the supply line of the second cleaning arrangement, and into the drain via the return line of the second cleaning arrangement; to control the supply system to open the controllable valves, thereby supplying water to the tank; and, after a while, to control the detergent supply system to supply detergent to the tank in response to the measured flow rate of mixed tap water in the outlet line, thereby forming the cleaning liquid, while the means comprised in, and/or connected to, the second cleaning arrangement is kept switched on. As a result, cleaning liquid is started to flow into the automatic milking system.

The control arrangement may be configured to disconnect the return line from the drain and to connect it to the tank; and to control the supply system to close the controllable valves and to control the detergent supply system to stop supplying detergent to the tank. The means comprised in, and/or connected to, the second cleaning arrangement is kept switched on to cause the cleaning liquid to circulate in the closed loop formed by the tank, the supply line of the second cleaning arrangement, the automatic milking system, and the return line of the second cleaning arrangement.

When the main cleaning phase is finished, the control arrangement is configured, still in the system cleaning mode, to disconnect the return line from the tank and to connect it to the drain; to control the supply system to open the controllable valves, thereby supplying water to the tank; and to control the means comprised in, and/or connected to, the second cleaning arrangement to flow water from the tank, through the milking system via the supply line of the second cleaning arrangement, and into the drain via the return line of the second cleaning arrangement to rinse the interior of the automatic milking system from the cleaning liquid.

The temperature of the water supplied to the tank in the system cleaning mode, in particular of the water supplied to the tank while the detergent is supplied to the tank to form the cleaning liquid used in the main cleaning phase, may be higher, or much higher, than the temperature of the water supplied to the tank in the milking mode.

By means of these provisions, the cleaning of the automatic milking system can be commenced directly without having to fill the tank firstly. Similarly, the main cleaning phase can be commenced while still cleaning liquid is being formed by the supply of water and detergent into the tank. By the second rinsing phase it can be ensured that not only the interior of the automatic milking system is rinsed from cleaning liquid, but also the interior of the tank and the interior of the second cleaning arrangement can be rinsed from cleaning liquid, such that cleaning liquid is prevented from reaching the at least one cleaning module for the teat cup and/or teat cleaning.

The flow rate and temperature of the supplied water and the supply times or supplied volumes of the water in the system cleaning mode may be controlled by the control arrangement.

A second aspect refers to an automatic milking system comprising the cleaning system of the first aspect.

A third aspect refers to a cleaning method adapted to an automatic milking system including teat cups, a milk collecting vessel, and a milk tube arrangement interconnecting the teat cups with the milk collecting vessel. According to the cleaning method, water is supplied by a water supply arrangement comprising a supply system connectable to cold and hot tap water, and a tank provided with an overflow, wherein the supply system has an outlet orifice for supplying water to the tank, wherein the orifice opens into the tank with a vertical air gap between the outlet orifice and the highest obtainable water level in the tank. The teat cups of the automatic milking system and/or the teats of milking animals are cleaned prior to being milked by the automatic milking system, by a first cleaning arrangement comprising at least one cleaning module, at least one feed line interconnecting the at least one cleaning module with the tank, and a feed pump for feeding the at least one cleaning module with water from the tank. The automatic milking system is cleaned by a second cleaning arrangement comprising a detergent supply system connected to the tank for supplying detergent to the tank, thus forming a cleaning liquid; and a supply line interconnecting the tank with the automatic milking system allowing the cleaning liquid to be supplied to the automatic milking system tank.

By the above aspects and embodiments, a cleaning system and method, respectively, are obtained which fulfill requirements to prevent pollution backflow, while simple installation and use of the cleaning system and simple and efficient execution of the cleaning method are supported.

Further characteristics and advantages will be evident from the detailed description of embodiments given hereinafter, and the accompanying FIGS. 1-2, which are given by way of illustration only.

DETAILED DESCRIPTION OF EMBODIMENTS

Figure 1:
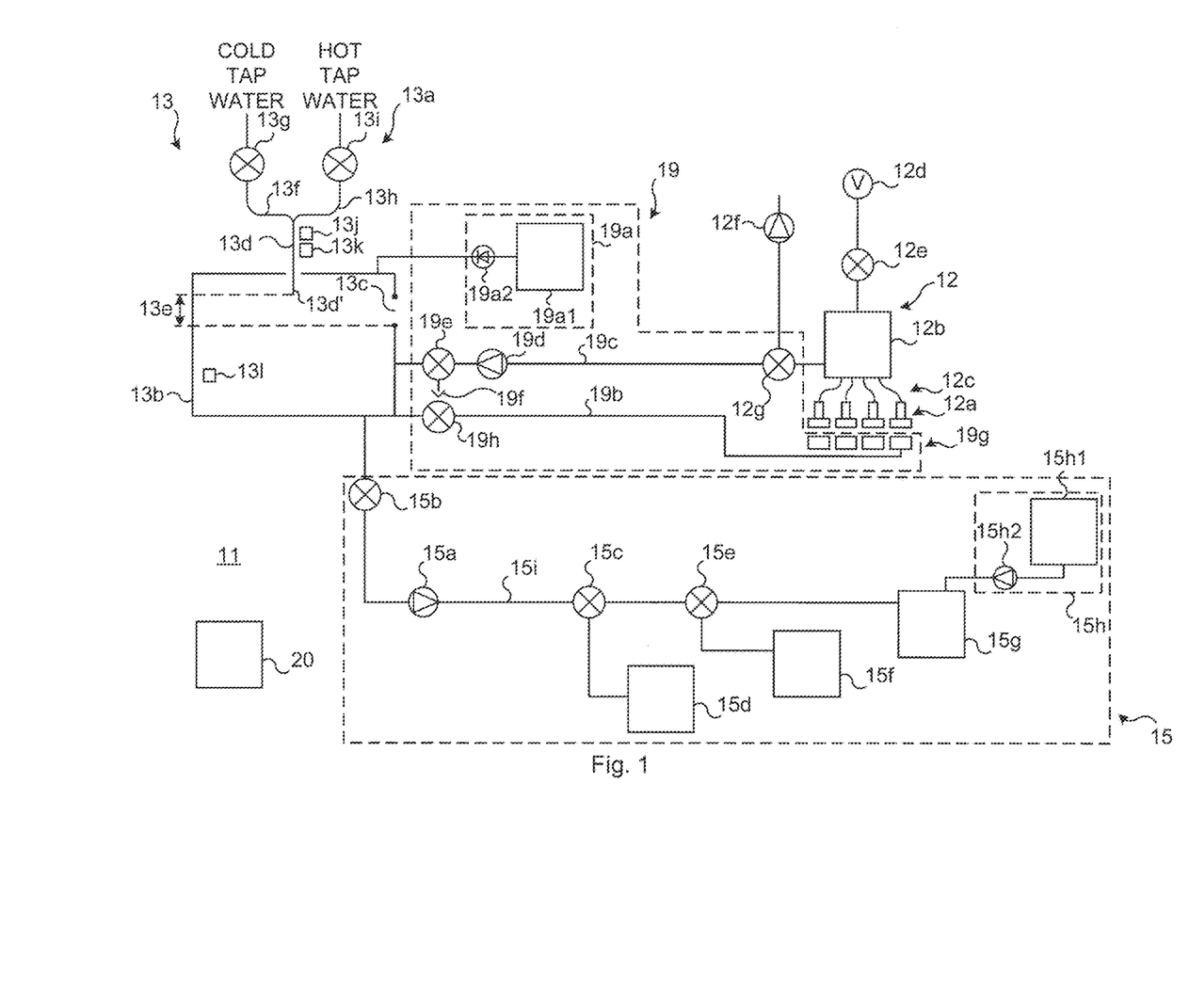
FIGS. 1 and 2 illustrate each, schematically, an automatic milking system equipped with a cleaning system according to a respective embodiment.

FIG. 1 illustrates, schematically, an automatic milking system 12 equipped with a cleaning system 11 according to an embodiment. The automatic milking system 12 comprises teat cups 12a, a milk collecting vessel 12b, a milk tube arrangement 12c interconnecting the teat cups 12a with the milk collecting vessel 12b, and a vacuum source 12d connected to the milk collecting vessel 12b via a controllable valve 12e. A milk pump 12f is connected to the milk collecting vessel 12b via a controllable three-way valve 12g for pumping milk collected in the milk collecting vessel 12b to a milk storage tank (not illustrated). The automatic milking system 12 may also comprise a robot (not illustrated) for automatically attaching the teat cups 12a to the teats of a milking animal to be milked. The automatic milking system 12 is arranged for automatic milking of milking animals and is controlled by a computer or similar, which constitutes or is comprised of a control arrangement 20. Further, the automatic milking system 12 may be provided with a milk sampling device (not illustrated) for automatically taking milk samples in connection with the milking.

The automatic milking system 12 may have a different design as long as it is configured for automatic milking of milking animals.

The cleaning system 11 comprises a water supply arrangement 13, first 15 and second 19 cleaning arrangements, and the control arrangement 20 for controlling the operation of the water supply arrangement 13, and the first 15 and second 19 cleaning arrangements.

The control arrangement 20 may be a computer for controlling the cleaning system 11 and the automatic milking system 12 or it may comprise a plurality of interconnected computers or control units, each with a dedicated responsibility.

The water supply arrangement 13 comprises a supply system 13a connectable to cold and hot tap water, e.g. originating from a city water supply or other supply of potable water, and a tank 13b provided with an overflow 13c, wherein the supply system 13a has an outlet line 13d with an outlet orifice 13d' in a downstream end thereof for supplying water to the tank 13b, wherein the outlet orifice 13d' opens into the tank with a vertical air gap 13e between the outlet orifice 13d' and the highest obtainable water level in the tank—typically coinciding with a lower end of the overflow 13c.

The overflow 13c may have a non circular shape such as e.g. rectangular shape, to resemble a slot of a mailbox or letterbox. The water supply arrangement 13 is advantageously designed such that it fulfills international or applicable national regulations for preventing pollution by backflow of potable water. In particular, the water supply arrangement 13 is designed to fulfill the Swedish standards Svensk Standard SS-EN 1717 and/or Svensk Standard SS-EN 13077:2008.

Further, the supply system 13a of the water supply arrangement 13 may comprise a cold water line 13f connectable to cold tap water and provided with a controllable valve 13g and a hot water line 13h connectable to hot tap water and provided with a controllable valve 13i, wherein the cold 13f and hot 13h water lines are connected to the outlet line 13d in an upstream end thereof. The control arrangement 20 may be configured to control the controllable valves 13g, 13i, thereby controlling the flow rate and temperature of the mixed tap water in the outlet line 13d.

Yet further, the supply system may comprise a flow meter 13j for repeatedly measuring the flow rate of mixed tap water in the outlet line 13d and a temperature sensor 13k for repeatedly measuring the temperature of mixed tap water in the outlet line 13d. The flow meter 13j and the temperature sensor 13k may be operatively connectable to the control arrangement 20 to repeatedly transmit their measured values to the control arrangement 20, wherein the control arrangement 20 is capable of regulating the flow rate and temperature of the mixed tap water in the outlet line 13d by means of controlling the controllable valves 13g, 13i based on the repeatedly transmitted measured values of the flow rate and temperature of the mixed tap water in the outlet line 13d.

The tank 13b of the water supply arrangement 13 may be provided with a level sensor 13l for repeatedly sensing the level of water in the tank 13b. The level sensor 13l may be operatively connectable to the control arrangement 20 to repeatedly transmit its measured value to the control arrangement 20, wherein the control arrangement is capable of regulating the flow rate of the mixed tap water in the outlet line 13d by means of controlling the controllable valves 13g, 13i based on the repeatedly transmitted measured value of the level of water in the tank 13b.

The first cleaning arrangement 15 is provided for cleaning the teat cups 12a of the automatic milking system 12 and the teats of milking animals before each milking animal is milked by the automatic milking system 12 in a mode, which may be referred to as a milking mode, under the control of the control arrangement 20. The teat cups 12a of the automatic milking system 12 may have their interiors as well as exteriors cleaned before each milking animal is milked by the automatic milking system 12, the former in a cleaning procedure known as back flush.

The second cleaning arrangement 19 is provided for cleaning the automatic milking system 12 at regular times such as e.g. three times per 24 hours in a mode, which may be referred to as a system cleaning mode, under the control of the control arrangement 20. During cleaning of the automatic milking system 12 at least the interior surfaces of the teat cups 12a, the milk collecting vessel 12b, and the milk tube arrangement 12C are cleaned.

The automatic milking system 12 is thus operated to milk animals in the milking mode, and is cleaned in the milkings system cleaning mode.

Both the first 15 and second 19 cleaning arrangements use water only from the water supply arrangement 13 as will be detailed below. The first cleaning arrangement 15 may comprise various cleaning modules 15d, 15f, 15g, a feed line 15i interconnecting the cleaning modules 15d, 15f, 15g with the tank 13b, and a feed pump 15a and controllable valves 15c, 15e for feeding water from the tank to a selected one of the cleaning modules 15d, 15f, 15g. A controllable shut off valve 15b may be arranged in the feed line 15i close to the tank 13b.

Alternatively, the cleaning modules 15d, 15f, 15g may be connected with separate feed lines to the feed pump 15a or to the tank 13*b*. In the latter case, separate feed pumps may be required for the different cleaning modules used.

The cleaning module 15*d* is a milk sampling device cleaning module responsible for cleaning of a milk sampling device of the automatic milking system 12. During cleaning of the milk sampling device, water from the tank 13*b* is fed by the feed pump 15*a* to the milk sampling device cleaning module 15*d* via the feed line 15*i* and the controllable valves 15*b*, 15*c*. The milk sampling device cleaning module 15*d* may be arranged to operate in any of the operating modes, but is preferably arranged to operate in the system cleaning mode, during which time the milk sampling device does not have to be used for sampling of milk.

The cleaning module 15*f* is a teat cup cleaning module responsible for cleaning of the teat cups 12*a* of the automatic milking system 12 between each milkings. During cleaning of the teat cups 12*a* of the automatic milking system 12, water from the tank 13*b* is fed by the feed pump 15*a* to the teat cup cleaning module 15*f* via the feed line 15*i* and the controllable valves 15*b*, 15*c*, 15*e*.

The cleaning module 15*g* is a teat cleaning module responsible for cleaning of the teats of each milking animal prior to being milked by the automatic milking system 12. During cleaning of the teats of the milking animals, water from the tank 13*b* is fed by the feed pump 15*a* to the teat cleaning module 15*g* via the feed line 15*i* and the controllable valves 15*b*, 15*c*, 15*e*.

The teat cleaning module 15*g* may be connected to a cleaning substance supply module 15*h* comprising a source 15*h*1 of the cleaning substance, and a pump 15*h*2 or other means for loading the cleaning substance from the source 15*h*1 into the teat cleaning module 15*g*. The cleaning substance supply module 15*h* may be useful if the teats of the milking animals are to be cleaned by other substances than pure water.

The milk sampling device cleaning module 15*d* and/or the teat cleaning module 15*g* may be provided with similar supply modules for supplying other substances than water to the respective cleaning module 15*d*, 15*g*.

In the milking mode, the control arrangement 20 may be configured to supply water to the tank 13*b* by means of controlling the controllable valve 13*g* of the cold water line 13*f* to open first and controlling the controllable valve 13*i* of the hot water line 13*h* to open thereafter, to avoid the risk of allowing water of higher temperatures than desired to enter the outlet line 13*d* and the tank 13*b*.

Further, the control arrangement 20 may be arranged, in the milking mode, to supply water to the tank 13*b* either of a given amount or to a given level, when the level sensor indicates a level falling below a threshold level, by controlling the controllable valves 13*g*, 13*i* to open, after which the controllable valves 13*g*, 13*i* are controlled to close. The water supplied to the tank 13*b* in the milking mode may have a temperature of between 20 and 40° C., preferably between 25 and 35° C.

The threshold level and/or the given amount or given level are/is set depending on the amount of water from the tank 13*b* which is used by the first cleaning arrangement 15 for a given time period or procedure, e.g. which is fed to the teat cup cleaning module 15*f* for cleaning the teat cups 12*a* of the automatic milking system 12 before a milking animal is milked by the automatic milking system 12 and/or which is fed to the teat cleaning module 15*g* for cleaning the teats of a milking animal prior to being milked by the automatic milking system 12.

The second cleaning arrangement 19 comprises a detergent supply system 19*a* connected to the tank 13*b* for supplying detergent to the tank 13*b*, thus forming a cleaning liquid. The detergent supply system 19*a* may comprise a source 19*a*1 of the detergent and a pump 19*a*2 or other means for loading the detergent from the source 19*a*1 into the tank 13*b*.

It shall be appreciated that the detergent supply system 19*a* may comprise more than one source of detergent, wherein the pump of the detergent supply system 19*a* may be configured to load the detergent from each of the sources of detergent.

Alternatively, there may be provided more than one detergent supply system connected to the tank 13*b* for supplying detergent to the tank 13*b*, wherein each detergent supply system comprises a source of the detergent and a pump or other means for loading the detergent from the source into the tank 13*b*.

In one embodiment, there is one source comprising an alkaline detergent and one source comprising an acidic detergent, wherein the alkaline and acidic detergents are alternately used for cleaning of the automatic milking system 12. Further, the second cleaning arrangement 19 comprises a supply line 19*b* interconnecting the tank 13*b* with the automatic milking system 12 allowing the cleaning liquid to be supplied to the automatic milking system 12, and a return line 19*c* interconnecting the automatic milking system 12 with the tank 13*b* via the controllable three-way valve 12*g* allowing the cleaning liquid to be returned to the tank 13*b*.

Alternatively, the return line 19*c* is exchanged for a waste line (not illustrated) interconnected to the automatic milking system 12 allowing the cleaning liquid to be removed from the automatic milking system 12.

The supply line 19*b* may be equipped with members 19*g* in the downstream end thereof to be connected to the teat cup 12*a* of the automatic milking system prior to cleaning thereof, wherein the vacuum source 12*d* of the automatic milking system is capable of being used to draw cleaning liquid from the tank 13*b*, through the supply line 19*b*, the teat cups 12*a*, the milk tube arrangement 12*c*, and into the milk collecting vessel 12*b*.

A controllable shut off valve 19*h* may be arranged in the supply line 19*b* close to the tank 13*b*.

A pump 19*d* and a controllable three-way valve 19 are arranged in the return line 19*c*, wherein the controllable three-way valve 19 can be switched such that the return line 19*c* is connected either to the tank 13*b* or to a drain 19*f*, and the pump 19*d* is thus capable of selectively pumping cleaning liquid from the milk collecting vessel 19*b* back to the tank 13*b* or to the drain 19*h*.

The control arrangement 20 may be configured, in the system cleaning mode, to control the vacuum source 12*d*, the pump 19*d*, and the controllable valves 19*h*, 12*g*, 19*e* to circulate the cleaning liquid in the closed loop formed by the tank 13*b*, the supply line 19*b*, the automatic milking system 12, and the return line 19*c* of the second cleaning arrangement.

Obviously, if the return line 19*c* is exchanged for the waste line (not illustrated) interconnected to the automatic milking system 12 no circulation of cleaning liquid is obtained. The cleaning fluid is instead removed from the automatic milking system 12 via the waste line.

Preferably, the milking system cleaning is divided into three cleaning phases wherein a main cleaning phase may constitute the above circulation of the cleaning liquid.

The control arrangement may thus also be configured, in the system cleaning mode, to control the vacuum source 12*d*, the pump 19*d*, and the controllable valves 19*h*, 12*g*, 19*e* to flow water from the tank 13b, through the supply line 19b, the milking system 12 (the teat cups 12a, the milk tube arrangement 12c, and the milk collecting vessel 19b), the return line 19c, and into the drain 19f prior to, and subsequent to, the main cleaning phase. A purpose of the first flow of water is to remove more easily removable milk residues in the automatic milking system 12 in a first rinsing phase prior to the main cleaning phase and a purpose of the second flow of water is to remove all cleaning liquid from the automatic milking system 12 in a second rinsing phase subsequent to the main cleaning phase.

More in detail, the supply of water and cleaning of the automatic milking system in the system cleaning mode may be controlled by the control arrangement 20 in the following manner.

When switching from the milking mode to the system cleaning mode, the three-way valve 12g is switched to disconnect the automatic milking system 12 from the milk storage tank and to connect it with the return line 19c of the second cleaning arrangement 19, and the controllable shut-off valve 19h is opened.

The vacuum source 12d and the pump 19d are switched on to start flow water from the tank 13b, through supply line 19b, the milking system 12, the return line 19c, and into the drain 19f to start the first rinsing phase. In connection thereto, the controllable valves 13g, 13i of the supply system 13a are opened, thereby supplying water to the tank 13b.

At a certain point of time (or after a certain amount of water supplied to the tank 13b), the detergent supply system 19a starts to supply detergent to the tank 13b in response to the measured flow rate of mixed tap water in the outlet line 13, thereby forming the cleaning liquid, while the vacuum source 12d and the pump 19d kept switched on. When it is assumed that the cleaning liquid at least has reached the controllable three-way valve 19e, the controllable three-way valve 19e is switched to disconnect the return line 19c from the drain 19f and to connect it to the tank 13b.

The controllable valves 13g, 13i of the supply system 13a are then closed and the detergent supply system 19a is stopped from supplying detergent to the tank 13b, and the cleaning liquid is circulated in the manner described above in the main cleaning phase.

Next, the return line 19c is disconnected from the tank 13b and is connected to the drain 19f such that the cleaning liquid can be removed via the drain 19f. The controllable valves 13g, 13i of the supply system 13a are opened, thereby again supplying water to the tank 13b.

The vacuum source 12d and the pump 19c1 are kept switched on to flow water from the tank 13b, through the supply line 19b, the milking system 12, the return line 19c, and into the drain 19f in the second rinsing phase.

When, the second rinsing phase is ended the controllable three-way valve 12 is switched to disconnect the automatic milking system 12 from the return line 19c and to connect it to the milk storage tank, the controllable shut off valve 19h is closed and the cleaning system 11 is switched to the milking mode, and the tank 13b can be supplied with water as disclosed above for the milking mode.

The first rinsing phase, the main cleaning phase, and the second rinsing phase can be performed continuously in the system cleaning mode without any stops or interruption of liquid flows.

It shall be appreciated that, in the milking mode, the control arrangement 20 may be configured to keep the detergent supply system 19a switched off from the tank 13b, and in the system cleaning mode, the control arrangement 20 may be configured to keep at least the teat cleaning module 15g, and optionally the teat cup cleaning module 15f, switched off from the tank 13b to avoid any risk of introducing detergent from the detergent supply system 19a into the teat cleaning module 15g and to avoid the risk of contaminating the interior of the automatic milking system 12 with detergent from the detergent supply system 19a in the milking mode.

Figure 2:
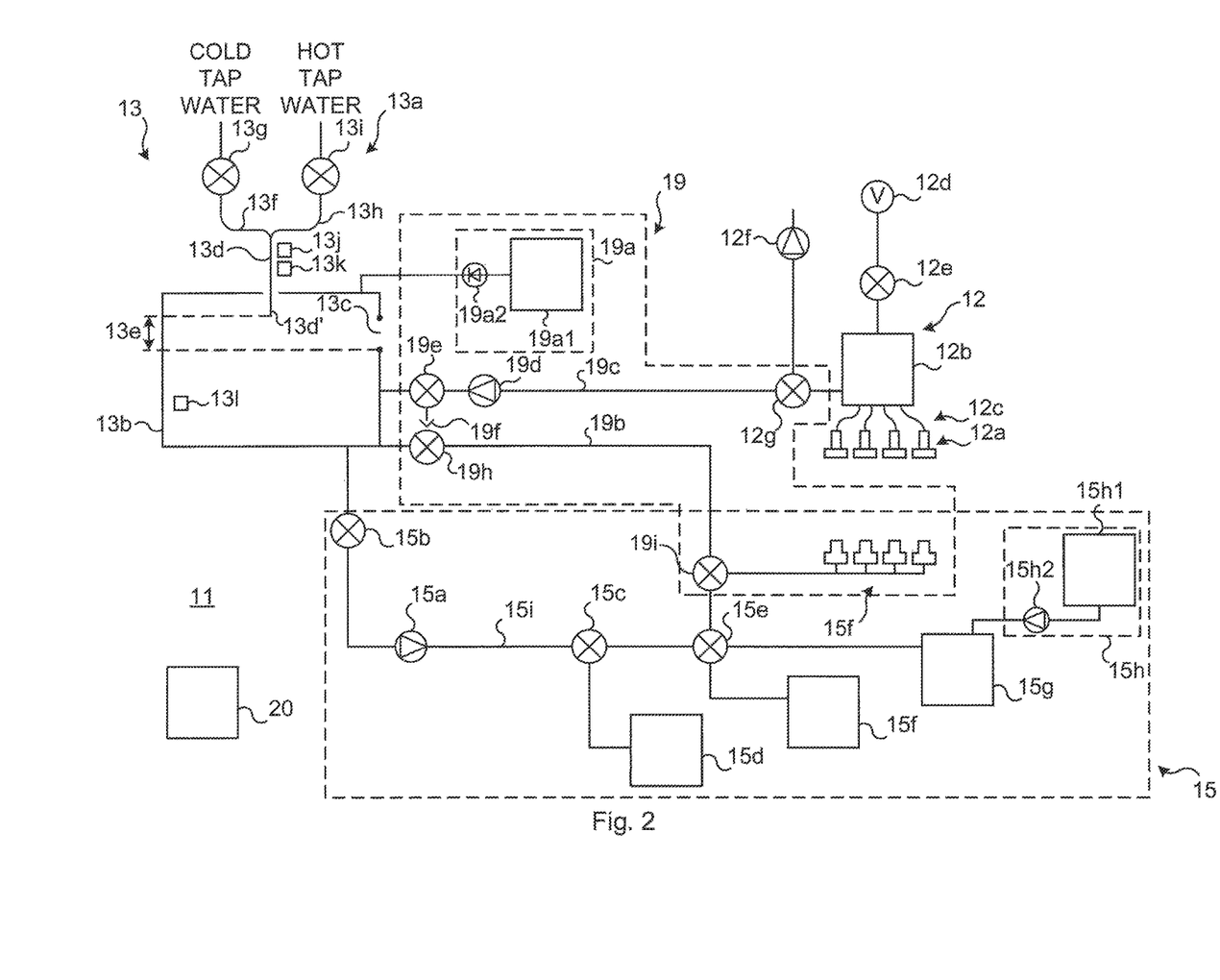

FIG. 2 illustrates, schematically, an automatic milking system 12 according to an embodiment, which differs from the embodiment of FIG. 1 only with respect to that the first 15 and second 19 cleaning arrangements share a few parts.

The teat cup cleaning module 15f of FIG. 2 comprises a number of cleaning members, which fit into the teat receiving openings of the teat cups 12 of the automatic milking system 12. These cleaning members of the teat cup cleaning module 15f are also used by the second cleaning arrangement 19 in the system cleaning mode instead of the members 19g in the downstream end of the supply line 19b of FIG. 1. To this end, there may be provided a controllable three-way valve 19i, which can be switched to selectively connect the cleaning members of the teat cup cleaning module 15f to the feed pump 15a of the first cleaning arrangement 15 via controllable valves 15, 15e in the milking mode, or to the downstream end of the supply line 19b in the system cleaning mode.

The present text refers to cleaning systems as described, but also to cleaning methods using such cleaning systems. The above detailed description of embodiments refers thus to both cleaning systems and cleaning methods.

The invention claimed is:

1. A cleaning system (11) adapted to an automatic milking system (12) including teat cups (12a), a milk collecting vessel (12b), and a milk tube arrangement (12c) interconnecting the teat cups with the milk collecting vessel, the cleaning system comprising:

a control arrangement (20) configured for alternately operating the cleaning system in a milking mode and in a system cleaning mode;

a water supply arrangement (13) operatively connected to and controlled by the control arrangement, the water supply arrangement comprising a supply system (13a) configured to connect to a cold tap water source and to a hot tap water source, and a tank (13b) provided with an overflow (13c) on a side portion of the tank, the overflow having an upper end and a lower end, an outlet of the cold tap water source and an outlet of the hot tap water source being connected to an outlet line (13d) that extends into the tank, below a top surface of the tank, and includes an outlet orifice (13d') in a downstream end thereof for supplying water from the cold tap water source and the hot tap water source through the outlet line (13d) to the tank, the outlet orifice opening into the tank at a height above the lower edge of the overflow (13c) thereby providing a vertical air gap (13e) between the outlet orifice and a highest obtainable water level in the tank;

a first cleaning arrangement (15) connected to the tank via a first controllable shut off valve (15b) and operatively connected to and controlled by the control arrangement during the milking mode for cleaning at least one of the group consisting of the teat cups of the automatic milking system and the teats of milking animals prior to being milked by the automatic milking system, the first cleaning arrangement comprising at least one cleaning module (15d, 15g), at least one first feed line (15i) interconnecting the at least one first cleaning module with the tank via the first controllable shut off valve (15b) being controlled by the control arrangement, and a first feed pump (15a), controlled by the control arrangement, for feeding water from the tank (13b) to the at least one first cleaning module via the at least one first feed line (15i); and a second cleaning arrangement (19) connected to the tank via a second controllable shut off valve (19h) and operatively connected to and controlled by the control arrangement during the system cleaning mode for cleaning the automatic milking system, the second controllable shut off valve (19hb) being controlled by the control arrangement, the second cleaning arrangement (19) comprising i) a detergent supply system (19a) connected to the tank (13b), the detergent supply system (19a) configured for supplying detergent to the tank, thus forming a cleaning liquid in the tank; and ii) a second supply line (19b) interconnecting the tank with the automatic milking system via the second controllable shut off valve (19h) being controlled by the control arrangement, and thereby allowing the cleaning liquid to be supplied from the tank to the automatic milking system via second supply line (19b) and the second controllable shut off valve (19h), wherein the control arrangement (20) is configured for controlling the operation of the water supply arrangement for alternately supplying i) water via from the tank to the at least one feed line (15i) of the first cleaning arrangement during the milking mode, and ii) the cleaning liquid from the tank to the supply line (19b) of the second cleaning arrangement during the system cleaning mode.

2. The cleaning system of claim 1, wherein the second cleaning arrangement further comprises a return line (19c) interconnecting the automatic milking system with the tank allowing the cleaning liquid to be returned to the tank.

3. The cleaning system of claim 1, wherein, the first cleaning arrangement is at least one of the group of i) a milk sampling device cleaning module responsible for cleaning of a milk sampling device of the automatic milking system, ii) a teat cleaning module responsible for cleaning of the teats of each milking animal prior to being milked by the automatic milking system, and iii) a teat cup cleaning module responsible to clean the teat cups of the automatic milking system, the control arrangement feeding only water from the tank, via the at least one first feed line (15i) and the first controllable shut off valve (15b), to the at least one first cleaning module for cleaning with water from the tank, and the control arrangement is configured, in the system cleaning mode, to control the second cleaning arrangement to clean the automatic milking system comprising feeding cleaning liquid from the tank to the automatic milking system via the second supply line and the second controllable shut off valve (19h) of the second cleaning arrangement.

4. The cleaning system of claim 3, wherein, in the milking mode, the control arrangement is configured to keep the detergent supply system switched off from the tank, and in the system cleaning mode, the control arrangement is configured to keep the at least one cleaning module switched off from the tank.

5. The cleaning system of claim 3, wherein the supply system further comprises:

a cold water line (13f) connectable to the cold tap water source and provided with a first controllable water valve (13g) and a hot water line (13h) connectable to the hot tap water source and provided with a second controllable water valve (13i), the cold and hot water lines being connected to the outlet line (13d) in an upstream end thereof; and the control arrangement (20) is configured to control the first and second controllable water valves, thereby controlling the flow rate and temperature of the mixed tap water in the outlet line.

6. The cleaning system of claim 5, wherein the supply system further comprises a flow meter (13j) for repeatedly measuring the flow rate of mixed tap water in the outlet line and a temperature sensor (13k) for repeatedly measuring the temperature of mixed tap water in the outlet line, the flow meter and the temperature sensor being operatively connectable to the control arrangement to repeatedly transmit their measured values to the control arrangement, wherein the control arrangement is configured for regulating the flow rate and temperature of the mixed tap water in the outlet line by means of controlling the first and second controllable water valves based on the repeatedly transmit measured values of the flow rate and temperature of the mixed tap water in the outlet line.

7. The cleaning system of claim 5, wherein, in the milking mode, the control arrangement is configured to supply water to the tank by means of controlling the first controllable water valve of the cold water line to open first and controlling the second controllable water valve of the hot water line to open thereafter, to avoid the risk of allowing water of higher temperatures than desired to enter the outlet line and the tank.

8. The cleaning system of claim 3, wherein the tank is provided with a level sensor for repeatedly sensing the level of water in the tank, the level sensor being operatively connectable to the control arrangement to repeatedly transmit a measured value to the control arrangement, wherein the control arrangement is configured for regulating the flow rate of the mixed tap water in the outlet line by means of controlling the first and second controllable water valves based on the repeatedly transmit measured value of the level of water in the tank.

9. The cleaning system of claim 8, wherein the control arrangement is arranged to supply water to the tank either of a given amount or to a given level, when the level sensor indicates a level falling below a threshold level, by controlling the first and second controllable water valves to open, after which the controllable valves are controlled to close.

10. The cleaning system of claim 9, wherein the threshold level and/or the given amount or given level are/is set depending on an amount of water from the tank which is fed to the at least on cleaning module.

11. The cleaning system of claim 8, further comprising a temperature sensor (13k) for measuring the temperature of mixed tap water in the outlet line, the temperature sensor being operatively connectable to the control arrangement to transmit a measured temperature value to the control arrangement, wherein the control arrangement is configured for regulating the temperature of the mixed tap water in the outlet line based on the transmitted measured temperature value in the outlet line so that the water of the given amount or supplied to a given level has a temperature of between 20 and 40° C.

12. The cleaning system of claim 3, wherein the control arrangement is configured, in the system cleaning mode, to control the first cleaning arrangement to clean a milk sampling device, comprising feeding water from the tank to a cleaning module (15d), which is responsible for cleaning of the milk sampling device.

13. The cleaning system of claim 1, wherein the second cleaning arrangement further comprises a return line (19c) interconnecting the automatic milking system with the tank allowing the cleaning liquid to be returned to the tank,
the control arrangement is configured, in the milking mode, to control the first cleaning arrangement to clean the teat cups of the automatic milking system and the teats of the milking animals prior to being milked by the automatic milking system comprising repetitively feeding water from the tank to the at least one cleaning module for cleaning the teat cups and feeding water from the tank to the at least a second cleaning module for cleaning the teat of the milking animals, and
the control arrangement is configured, in the system cleaning mode, to control the second cleaning arrangement to clean the automatic milking system comprising feeding cleaning liquid from the tank to the automatic milking system via the supply line of the second cleaning arrangement,
wherein the control arrangement is configured, in the system cleaning mode, to control means (19d, 12d) comprised in, and/or connected to, the second cleaning arrangement to circulate the cleaning liquid in the closed loop formed by the tank, the supply line of the second cleaning arrangement, the automatic milking system, and the return line of the second cleaning arrangement.

14. The cleaning system of claim 13, wherein the control arrangement is configured, in the system cleaning mode, to control said means comprised in, and/or connected to, the second cleaning arrangement to flow water from the tank, through the milking system via the supply line of the second cleaning arrangement, and into a drain (19f) via the return line of the second cleaning arrangement prior to, and subsequent to, the circulation of the cleaning liquid in the closed loop formed by the tank, the supply line of the second cleaning arrangement, the automatic milking system, and the return line of the second cleaning arrangement.

15. The cleaning system of claim 14,
wherein the supply system further comprises:
a cold water line (13f) connectable to the cold tap water source and provided with a first controllable water valve (13g) and a hot water line (13h) connectable to the hot tap water source and provided with a second controllable water valve (13i),
wherein the control arrangement is configured, in the system cleaning mode,
(i) to switch on said means comprised in, and/or connected to, the second cleaning arrangement to start flow water from the tank, through the milking system via the supply line of the second cleaning arrangement, and into the drain via the return line of the second cleaning arrangement;
(ii) to control the supply system to open the first and second controllable water valves, thereby supplying water to the tank;
(iii) to control the detergent supply system to supply detergent into the tank in response to the measured flow rate of mixed tap water in the outlet line, thereby forming the cleaning liquid, while said means comprised in, and/or connected to, the second cleaning arrangement is kept switched on;
(iii) to disconnect the return line from the drain and to connect the return line to the tank;
(iv) to control the supply system to close the first and second controllable water valves and to control the detergent supply system to stop supplying detergent to the tank; and
(v) to control said means comprised in, and/or connected to, the second cleaning arrangement to circulate the cleaning liquid in the closed loop formed by the tank, the supply line of the second cleaning arrangement, the automatic milking system, and the return line of the second cleaning arrangement.

16. The cleaning system of claim 15, wherein the control arrangement is configured, in the system cleaning mode, and after the steps (i)-(v):
(vi) to disconnect the return line from the tank and to connect the return line to the drain;
(vii) to control the supply system to open the controllable valves, thereby supplying water to the tank;
(viii) to control said means comprised in, and/or connected to, the second cleaning arrangement to flow water from the tank, through the milking system via the supply line of the second cleaning arrangement, and into the drain via the return line of the second cleaning arrangement.

17. An automatic milking system comprising:
teat cups (12a);
a milk collecting vessel (12b);
a milk tube arrangement (12c) interconnecting the teat cups with the milk collecting vessel; and
a cleaning system (11) comprising:
a control arrangement (20) configured for alternately operating the cleaning system in a milking mode and in a system cleaning mode;
a water supply arrangement (13) operatively connected to and controlled by the control arrangement, the water supply arrangement comprising a supply system (13a) configured to connect to a cold tap water source and to a hot tap water source, and a tank (13b) provided with an overflow (13c) on a side portion of the tank, the overflow having an upper end and a lower end, an outlet of the cold tap water source and an outlet of the hot tap water source being connected to an outlet line (13d) that extends into the tank, below a top surface of the tank, and includes an outlet orifice (13d') in a downstream end thereof for supplying water from the cold tap water source and the hot tap water source through the outlet line (13d) to the tank, the outlet orifice opening into the tank at a height above the lower edge of the overflow (13c) thereby providing a vertical air gap (13e) between the outlet orifice and a highest obtainable water level in the tank;
a first cleaning arrangement (15) connected to the tank via a first controllable shut off valve (15b) and operatively connected to and controlled by the control arrangement during the milking mode for cleaning at least one of the group consisting of the teat cups of the automatic milking system and the teats of milking animals prior to being milked by the automatic milking system,
the first cleaning arrangement comprising at least one cleaning module (15d, 15g), at least one first feed line (15i) interconnecting the at least one first cleaning module with the tank via the first controllable shut off valve (15b) being controlled by the control arrangement, and a first feed pump (15a), controlled by the control arrangement, for feeding water from the tank (13b) to the at least one first cleaning module via the at least one first feed line (15i); and a second cleaning arrangement (19) connected to the tank via a second controllable shut off valve (19h) and operatively connected to and controlled by the control arrangement during the system cleaning mode for cleaning the automatic milking system, the second controllable shut off valve (19hb) being controlled by the control arrangement, the second cleaning arrangement (19) comprising i) a detergent supply system (19a) connected to the tank (13b), the detergent supply system (19a) configured for supplying detergent to the tank, thus forming a cleaning liquid in the tank; and ii) a second supply line (19b) interconnecting the tank with the automatic milking system via the second controllable shut off valve (19h) being controlled by the control arrangement, and thereby allowing the cleaning liquid to be supplied from the tank to the automatic milking system via second supply line (19b) and the second controllable shut off valve (19h), wherein the control arrangement (20) is configured for controlling the operation of the water supply arrangement for alternately supplying i) water via from the tank to the at least one feed line (15i) of the first cleaning arrangement during the milking mode, and ii) the cleaning liquid from the tank to the supply line (19b) of the second cleaning arrangement during the system cleaning mode.

18. A cleaning method adapted to an automatic milking system (12) including teat cups (12a), a milk collecting vessel (12b), and a milk tube arrangement (12c) interconnecting the teat cups with the milk collecting vessel, the method comprising:

under control of a control arrangement (20) configured for alternately operating the cleaning system in a milking mode and in a system cleaning mode under control of a control arrangement (20), supplying water from a water supply arrangement (13) comprising a supply system (13a) connected to cold and hot tap water, and a tank (13b) provided with an overflow (13c) on a side portion of the tank, the overflow having an upper end and a lower end, an outlet of the cold tap water source and an outlet of the hot tap water source being connected to an outlet line (13d) that extends into the tank, below a top surface of the tank, wherein the outlet line ends in an outlet orifice (13d') for supplying water to the tank, the orifice opening into the tank below a top surface of the tank and at a height above the lower edge of the overflow (13c) thereby providing a vertical air gap (13e) between the outlet orifice and a highest obtainable water level in the tank;

under control of the control arrangement (20), during a milking mode, cleaning at least one of the group consisting of the teat cups of the automatic milking system and the teats of milking animals prior to being milked by the automatic milking system, by a first cleaning arrangement (15) connected to the tank via a first controllable shut off valve (15b) and comprising at least one cleaning module (15d, 15g), at least one first feed line (15i) interconnecting the at least one cleaning module with the tank, and a feed pump (15a) for feeding water from the tank to the at least one cleaning module; and under control of the control arrangement (20), during a system cleaning mode, cleaning the automatic milking system by a second cleaning arrangement (19) connected to the tank via a second supply line (19b) having a second controllable shut off valve (19h) and further comprising a detergent supply system (19a) connected to the tank for supplying detergent to the tank, thus forming a cleaning liquid in the tank; the second supply line (19b) interconnecting the tank with the automatic milking system allowing the cleaning liquid to be supplied to the automatic milking system, wherein the first and second controllable shut off valves are controlled by the control arrangement, wherein the control arrangement (20) is operated for controlling the operation of the water supply arrangement for alternately supplying i) only water from the tank to the at least one first feed line (15i) of the first cleaning arrangement during the milking mode and ii) the cleaning liquid from the tank to the supply line (19b) of the second cleaning arrangement during the system cleaning mode.

19. The cleaning method of claim 18, wherein, the automatic milking system is cleaned by the second cleaning arrangement, which comprises a return line (19c) interconnecting the automatic milking system with the tank allowing the cleaning liquid to be returned to the tank, wherein, the teat cups of the automatic milking system and the teats of milking animals are cleaned in the milking mode, with water from the tank being repetitively fed to the at least one cleaning module for cleaning the teat cups and feeding water from the tank to the at least a second cleaning module for cleaning the teat of the milking animals, the automatic milking system is cleaned in the system cleaning mode, with the cleaning liquid from the tank being fed to the automatic milking system via the supply line of the second cleaning arrangement, and in the milking mode, the detergent supply system is kept switched off from the tank, and in the system cleaning mode, the at least one cleaning module, is kept switched off from the tank.

* * * * *